…

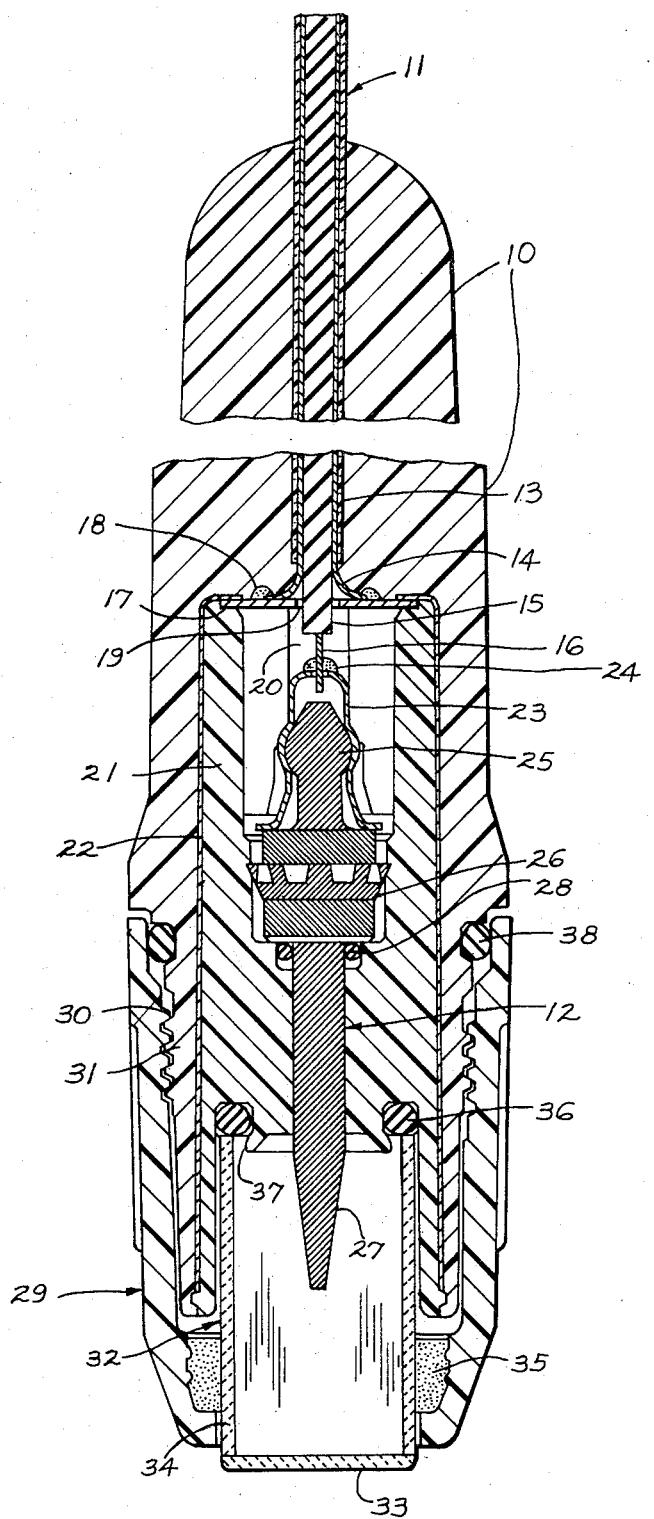

United States Patent Office

3,806,440
Patented Apr. 23, 1974

3,806,440
ELECTRODE WITH REPLACEABLE ION SELECTIVE GLASS SENSOR
Don N. Gray, Sylvania, and Philip J. Breno, Oregon, Ohio, assignors to Owens-Illinois, Inc., Toledo, Ohio
Filed Apr. 2, 1973, Ser. No. 346,957
Int. Cl. G01n 37/46
U.S. Cl. 204—195 G
9 Claims

ABSTRACT OF THE DISCLOSURE

An electrode useful for determining ions in solution is equipped with a removable cap containing an ion selective sensor. The sensor which is permanently sealed to the cap can be easily replaced in case of damage or another sensor having a different ion selectivity readily substituted for determining other ions by simply exchanging caps containing the appropriate glass sensors.

BACKGROUND OF THE INVENTION

Glass electrodes for measuring pH have been known since the early 1900's. More recently glass electrodes selective for various metallic and other ions have become commercially available. An electrode made of a glass composition selective for sodium ions, for example, was described in U.S. Pat. 2,829,090 to G. Eisenman et al. A glass electrode for measuring potassium ions was described in U.S. Pat. 3,041,252 to G. Eisenman et al. One for measuring silver ions was described in U.S. Pat. 3,278,399 to A. L. Budd. Such electrodes are currently available for measuring a wide variety of both cations and anions.

In general glass electrodes have been fabricated by blowing a thin bulb on the end of a tube of ion selective glass or by fusing such a thin selective glass bulb to the end of a generally thicker and more inert stem glass which formed the major body of the electrode.

Although such glass electrodes have achieved wide usage there have been several serious problems inherent in their manufacture and use. Fabrication of these glass electrodes has required specialized glass blowing techniques in order to provide the needed thin ion selective glass sensing head or bulb. Because the electrodes themselves have been made of glass and because the blown bulbs of ion sensitive glass have necessarily been very thin, these electrodes have been extremely fragile and have required frequent replacement. It has also been necessary to have available a variety of different complete electrodes in order to measure different ions.

U.S. Pat. 3,598,712 to A. J. Peterson describes an electrode having replaceably mounted ion sensitive glass bulb structure. Such construction, however, is still subject to many of the aforementioned disadvantages of a conventional glass electrode and in addition presents the problem of electrical leakage between the ion sensitive glass bulbs and the body of the electrode. The mechanical seal suggested is at best of temporary utility.

An electrode which could be equipped interchangeably with a variety of easily fabricated and relatively durable ion selective glass sensors, in which breakage of the glass sensor would require only that a new glass sensor be substituted for the old and not that the entire electrode be replaced, and in which the problem of electrical leakage is obviated would offer significant advantages over the glass electrodes currently known.

It is accordingly an object of this invention to provide an electrode equipped with an improved removable ion selective glass sensor.

Another object of this invention is to provide an electrode in which breakage of the ion selective glass sensor requires only replacement of such sensor. Another object of this invention is to provide such an electrode in which one type of ion selective glass sensor can be readily interchanged for another in order to measure a variety of different ionic species.

Another object of this invention is to provide an electrode having an ion selective glass sensor which is easily fabricated and relatively durable.

Yet another object of this invention is to overcome the disadvantage of electrical leakage inherent in the use of electrodes having replaceable glass sensing bulbs.

Other objects and advantages of this invention will become apparent from the following detailed disclosure and description.

SUMMARY OF THE INVENTION

An electrode having a replaceable ion selective glass sensor comprises an electrode body containing a standard reference electrode and apparatus for making an electrical connection to an external electrical circuit, such as to a potential measuring device and fitted with a removable cap containing an ion selective glass sensor permanently adhered thereto. The combination of the electrode body and detachable cap furnishes a reservoir for an electrolyte which is maintained in contact with the internal reference electrode and ion selective glass sensor.

The use of a cap containing the ion selective glass sensor furnishes the means for providing a variety of electrodes having sensors which are selective to various ionic species such as hydrogen ions, or other monovalent cations, for example, sodium ions. Merely by replacing one cap containing one particular sensor with another cap containing another sensor it is possible to provide an electrode having an entirely different ionic selectivity. Likewise it is possible to replace broken glass sensors without replacing the entire electrode.

Thus an entire set of electrodes having differing ionic specificities are available using a single electrode body, internal reference electrode and electrolyte together with a set of caps each containing a glass sensor having a particular desired ionic selectivity.

DESCRIPTION OF THE DRAWING

The single figure is a vertical sectional view of the electrode of this invention.

DESCRIPTION OF THE PREFERRED EMBODIMENTS

Referring now to the figure electrode body 10 which can be formed from any suitable plastic material such as a polyacetal or melamine resin or other chemically stable, low creep plastic contains coaxial cable 11 and reference electrode 12. Cable 11 consists of outer insulation layer 13, braided shielding 14, inner insulation layer 15 and conductor 16. Shielding 14 is connected to metal washer 17 by means of solder joint 18. Inner insulation layer 15 of cable 11 passes through hole 19 in washer 17 into air space 20 in insulator 21 which may be formed from a phenolic resin. The exterior surface of insulator 21 is separated from body 10 by washer 17 and perforated shield 22 which is attached to washer 17 and molded to electrode body 10. Perforated shield 22 may be formed from copper, brass or aluminum. Conductor 16 is connected to socket 23 by means of solder joint 24. Reference electrode 12 is electrically connected to socket 23 by means of plug 25 which is connected to collar 26 which abuts insulator 21. Silver-silver chloride electrode 27 extends from collar 26 at the end of the reference electrode 12 remote from plug 25. O-ring 28 encircles reference electrode 12. Cap 29 which is of the same material as electrode body 10 is attached to electrode body 10 by means of threads 30 which engage mating threads 31 of body 10. Glass sensor 32 consists of ion selective glass sensing disc 33, which may, for example, be fabricated from a pH sensitive glass and which is fused to chemically resistant glass cylinder 34 which is permanently cemented to cap 29 by means of adhesive 35 which is a chemically durable adhesive preferably a thermosetting adhesive such as an epoxy resin. Glass sensor 32 is separated from insulator 21 by means of O-ring 36 which is held in position by means of retainer 37 formed at the end of insulator 21 remote from washer 17. O-ring 38 separates cap 29 from electrode body 10 and together with O-ring 36 insures a fluid-tight seal enabling the electrode to be immersed in liquid above the thread-line without leakage.

The glass sensor has a flat sensing surface which renders it rugged and less prone to breakage than the conventional bulb-shaped or hemispherical electrodes. This flat-bottomed electrode is especially useful for measuring the ionic activity of small samples. Even surface films of fluids can be readily measured because of the essentially planar configuration of the sensor.

Fabrication of the flat-bottomed glass sensor is readily accomplished by means of a glass to glass seal using a flat disc of a glass having the desired ionic selectivity and a cylindrical stem of chemically resistant glass. The ion selective glass disc is attached at a right angle to the axis of the cylinder by fusing.

The use of a chemically resistant glass stem facilitates providing a seal to the plastic cap since an adhesive such as an epoxy adhesive can be used to cement the exterior wall of the cylindrical glass stem to the interior wall of the plastic cap thus providing an electrode in which electrical leakage is prevented.

In case of breakage the cap to which the glass sensor is cemented is replaced and the remainder of the electrode is reused. A number of different caps to which glass sensors having different ionic selectivities are cemented can be used interchangeably in order to enable the measurement of a number of different ionic activities.

The caps thus provided can be easily fastened to the body of the electrode or removed therefrom by means of threads or other suitable frictional engagements.

We claim:
1. In an ion selective electrode comprising
an electrode body,
a reference electrode within said electrode body,
means for connecting said reference electrode to an external electrical circuit,
and a cap containing an ion selective glass sensor,
said cap being detachably connected to said electrode body and closing one end thereof,
the improvement wherein said ion selective glass sensor is cemented to at least a part of the inside surface of said cap.

2. An electrode according to claim 1 wherein said ion selective glass sensor comprises a disc of ion selective glass fused to the end of a cylinder of chemically resistant glass.

3. An electrode according to claim 1 wherein said ion selective glass sensor is cemented to said cap by means of a chemically durable adhesive.

4. An electrode according to claim 1 wherein said ion selective glass sensor is cemented to said cap by means of a thermosetting adhesive.

5. An electrode according to claim 1 wherein said ion selective glass sensor is cemented to said cap by means of an epoxy resin.

6. An electrode according to claim 1 wherein said ion selective glass sensor comprises a disc of pH sensitive glass fused to the end of a cylinder of chemically resistant glass.

7. An electrode according to claim 1 wherein said ion selective glass sensor comprises a disc of a glass which is selective for monovalent cations fused to the end of a cylinder of chemically resistant glass.

8. An electrode according to claim 1 wherein said ion selective glass sensor comprises a disc of a glass which is selective for sodium ions fused to the end of a cylinder of chemically resistant glass.

9. An electrode according to claim 1 wherein said cap is threadedly connected to said electrode body.

References Cited
UNITED STATES PATENTS

| | | | |
|---|---|---|---|
| 3,145,157 | 8/1964 | Arthur et al. | 204—195 G |
| 3,476,672 | 11/1969 | Snyder et al. | 204—195 G |
| 3,598,712 | 8/1971 | Petersen | 204—195 G |

GERALD L. KAPLAN, Primary Examiner